United States Patent [19]

Conley et al.

[11] Patent Number: 5,076,451
[45] Date of Patent: Dec. 31, 1991

[54] HYDRAULIC CUSHIONING UNIT

[76] Inventors: Arthur Conley, 12821 Mission Cir., Anchorage, Ak. 99516; Joseph Mulligan, Jr., 2314 Kansas Ave., Omaha, Nebr. 68110

[21] Appl. No.: 434,299

[22] Filed: Nov. 13, 1989

[51] Int. Cl.[5] .............................................. B61G 9/08
[52] U.S. Cl. ....................................... 213/43; 188/287
[58] Field of Search ................. 213/7, 10, 43, 64, 223; 188/287, 315, 318, 322.19; 267/116, 3, 126, 115

[56] References Cited

U.S. PATENT DOCUMENTS

| 1,494,135 | 5/1924 | Robison et al. | 188/287 |
| 1,733,395 | 10/1929 | Blanchard | 188/287 |
| 3,307,842 | 3/1967 | Ellis | 188/287 |
| 3,589,528 | 6/1971 | Stephenson | 213/43 |
| 4,805,517 | 2/1989 | Conley et al. | 213/43 |

FOREIGN PATENT DOCUMENTS 1419232 10/1965 France ............................. 188/287

Primary Examiner—Robert P. Olszewski
Assistant Examiner—Mark T. Le
Attorney, Agent, or Firm—John A. Beehner

[57] ABSTRACT

A hydraulic cushioning unit includes a high pressure cylinder having a piston therein and a piston rod extended through the rod end of the cylinder. The cylinder is contained within an outer housing. A head casting closes the head ends of the cylinder and housing and an end cap closes the rod ends thereof. The end cap includes a ball stop sleeve protruding interiorly of the cylinder for cooperating with a ball valve port through the cylinder adjacent the rod end thereof to accomplish returned valving of fluid into the high pressure cylinder behind the piston. The same ball stop sleeve supports a resilient bumper for limiting the extent of movement of the cylinder in response to draft forces.

10 Claims, 7 Drawing Sheets

HYDRAULIC CUSHIONING UNIT

BACKGROUND OF THE INVENTION

The present invention is directed generally to an improved gas return railway car hydraulic cushioning device and more particularly to such a device including a simple rugged end cap which includes an interiorly directed protrusion for cooperating with one or more ball valves near the adjacent end of the high pressure cylinder to accomplish valving of hydraulic fluid from the main reservoir into the interior of the high pressure cylinder in response to relative movement between the piston and cylinder in one direction.

The cushioned under frame of a railway car generally includes a pair of end-of-car cushioning devices or gears at opposite ends of the car for providing a resilient or hydraulically controlled connection between the center sill and coupler. Each gear includes a hydraulic system consisting of two chambers related by valves and ports. These include the high pressure inner cylinder having a piston reciprocally moveable therein and the low pressure outer housing.

Impact energy from coupling, starting and stopping forces is transmitted from the coupler through the outer housing and hydraulic cylinder system to the center sill of the railway car. As the cylinder closes on the piston through impact, oil is forced from the cylinder into the outer housing through metering ports appropriately sized and placed. The oil is instantly returned behind the piston so that hydraulic cushioning is continuously provided within the cylinder when both draft and buff forces are exerted on the railway car.

When external forces are removed from the hydraulic cushioning device, the piston should be returned to a neutral position so that the device can effectively cushion the next impact. Restoring forces have conventionally been provided either by the repositioning springs of a separate restoring mechanism or by pressurized gas within the cushioning unit itself. Spring restoring mechanisms generally have the disadvantage of directing the restoring force along a line offset below the center line of the main cylinder, thereby inducing a canting of the cushioning device within the sill. Whereas gas return hydraulic cushioning units eliminate the off center forces and maintenance problems associated with mechanical restoring mechanisms, most are either expensive to manufacture, or they produce an unpredictable spongy cushioning action. An improved gas return hydraulic cushioning unit is disclosed in Conley et al., U.S. Pat. No. 4,805,517, wherein the mixing of gas and hydraulic oil in the chambers interiorly and exteriorly of the high pressure cylinder unit is avoided by strategic placement of metering ports through the cylinder wall at positions below the level of gas in the exterior chamber. Whereas that invention is believed to have provided a substantial advance in the art, it nevertheless included the conventional and complicated internal valving plate assembly at the rod end of the high pressure cylinder for return flow of hydraulic oil into the main cylinder behind the piston in response to buff forces on the railway car. That valving plate included numerous parts including the plate subject to bending, valves which can lock up, springs which could lose tension, and seals which wear out, adding to both the expense and required maintenance for the hydraulic cushioning unit.

Accordingly, a primary object of the invention is to provide an improved hydraulic cushioning unit.

More specifically, an object of the invention is to provide an improved gas return hydraulic cushioning unit including a simple rugged end cap adapted to cooperate with ball valves in the adjacent end of the high pressure cylinder to accomplish valving of hydraulic fluid from the main reservoir into the high pressure cylinder.

Another object is to provide such a unit of simple and economical construction.

Another object is to provide such a unit with minimum maintenance requirements.

Another object is to provide such a unit which affords internal mechanical cushioning of the piston in the limit position thereof in response to draft forces on the railway car.

Another object is to provide such a unit with a simple rugged end cap which closes one end of the cylinder and housing, affords mechanical cushioning for the piston and cooperates with ball valves in the adjacent end of the high pressure cylinder to afford valving of hydraulic fluid flow from the main reservoir to the high pressure cylinder.

Finally, another object is to provide a gas return railway car hydraulic cushioning unit which is simple and rugged in construction, economical to manufacture and efficient in operation.

SUMMARY OF THE INVENTION

The present invention is directed to an improved railway car hydraulic cushioning unit which includes a high pressure cylinder encased within an outer housing. A head casting closes one end of both the outer housing and high pressure cylinder and a simple rugged end cap closes the opposite rod end of both the outer housing and high pressure cylinder. The high pressure cylinder is moveable longitudinally of a piston having a piston rod extended through an opening through the end cap for securement to the railway car center sill. A series of metering or porting holes are formed through the wall of the high pressure cylinder so as to provide a hydraulically controlled cushioned transfer of forces between the coupler and center sill of the railway car. The main reservoir is only partially filled with hydraulic oil, with the remaining space above the oil charged with a pressurized gas. To afford a positive predictable cushioning effect, the porting holes are strategically placed below the level of gas in the main reservoir thereby to minimize any mixing of the oil and gas and to eliminate any foaming action resulting therefrom.

The end cap includes a ball stop protruding generally axially into the high pressure cylinder for cooperation with a ball valve in the lower portion of the cylinder adjacent the rod end thereof. The ball valve includes a valve hole through the cylinder, a ball seat at the interior end of the valve hole and a ball removably seated on the ball seat. The ball stop protrusion of the end cap is positioned in spaced relation from a ball seated on the ball seat, such that the clearance between the stop and ball enables valving displacement of the ball from the ball seat yet prevents dislodgement of the ball from the valve.

The ball stop protrusion of the end cap furthermore may be of a length and shape to support and properly position a bumper on the interior end thereof for limiting piston travel toward the rod end of the high pressure cylinder.

In a preferred embodiment, a plurality of ball valves are provided adjacent the rod end of the high pressure cylinder, all of which coact with a single sleeve-shaped ball stop which encircles the piston rod and carries a rod guide for axially slideably supporting the piston rod at the end cap. The single end cap may have an interiorly facing socket formed therein for receiving the rod end of the high pressure cylinder in press fit relation. The end cap is preferably welded to the outer housing to complete assembly of the hydraulic cushioning unit of the invention.

The present invention affords a substantial advancement in the repair and maintenance of railway car end of car cushioning units by substantially simplifying the construction thereof and eliminating the many working parts of the conventional clapper valve assembly associated with the main cylinder end cap of prior art cushioning units.

DESCRIPTION OF THE PREFERRED EMBODIMENT

Figure 1:
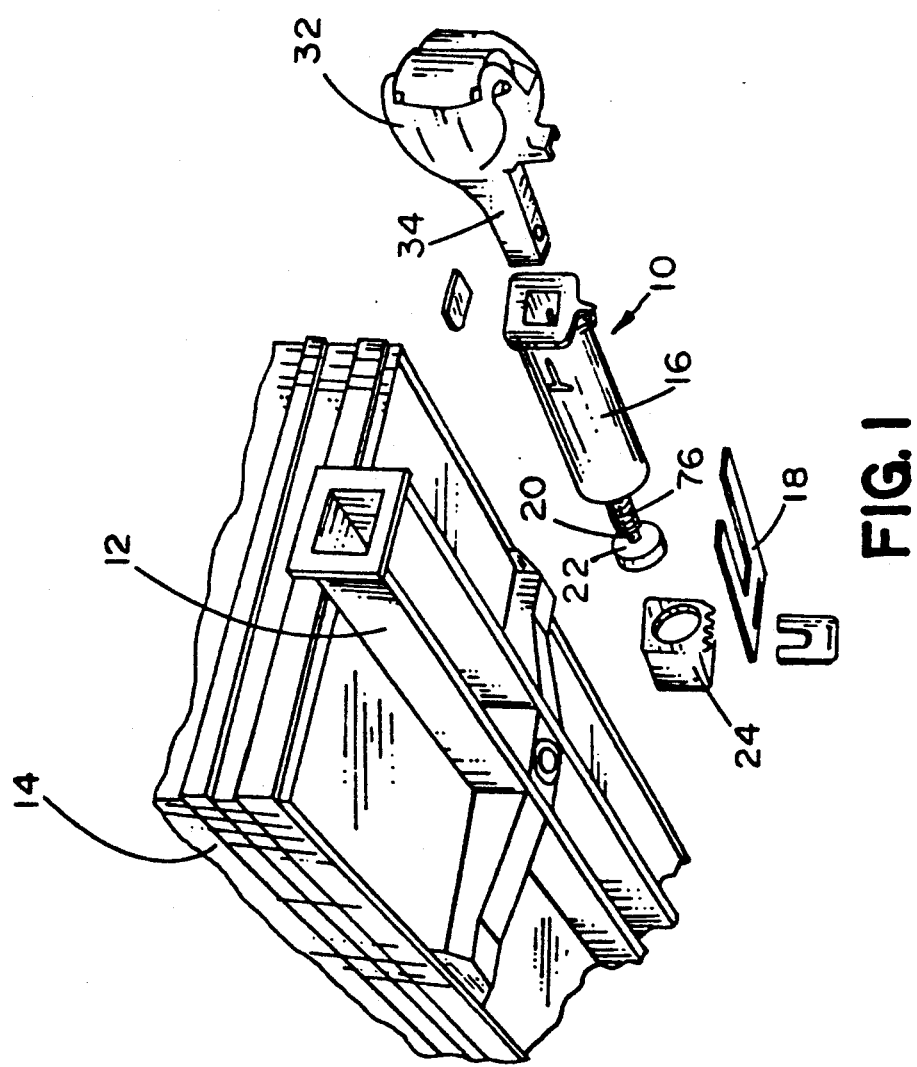
FIG. 1 is a partial exploded perspective view of the cushioned underframe at one end of a railway car.

FIG. 1 illustrates a typical installation of a hydraulic cushioning unit 10 within the sill 12 on the underside of a railway car 14. The outer housing 16 of hydraulic cushioning unit 10 is slideably supported within sill 12 on a sill base plate 18. A piston rod 20 extends from one end of the hydraulic cushioning unit 10 and carries a shaft alignment stop 22 on its free end. Stop 22 is secured against longitudinal movement relative to the sill 12 by placement within an anchor housing 24 which, in turn, is secured within the sill 12 by welding or other suitable means.

Figure 2:
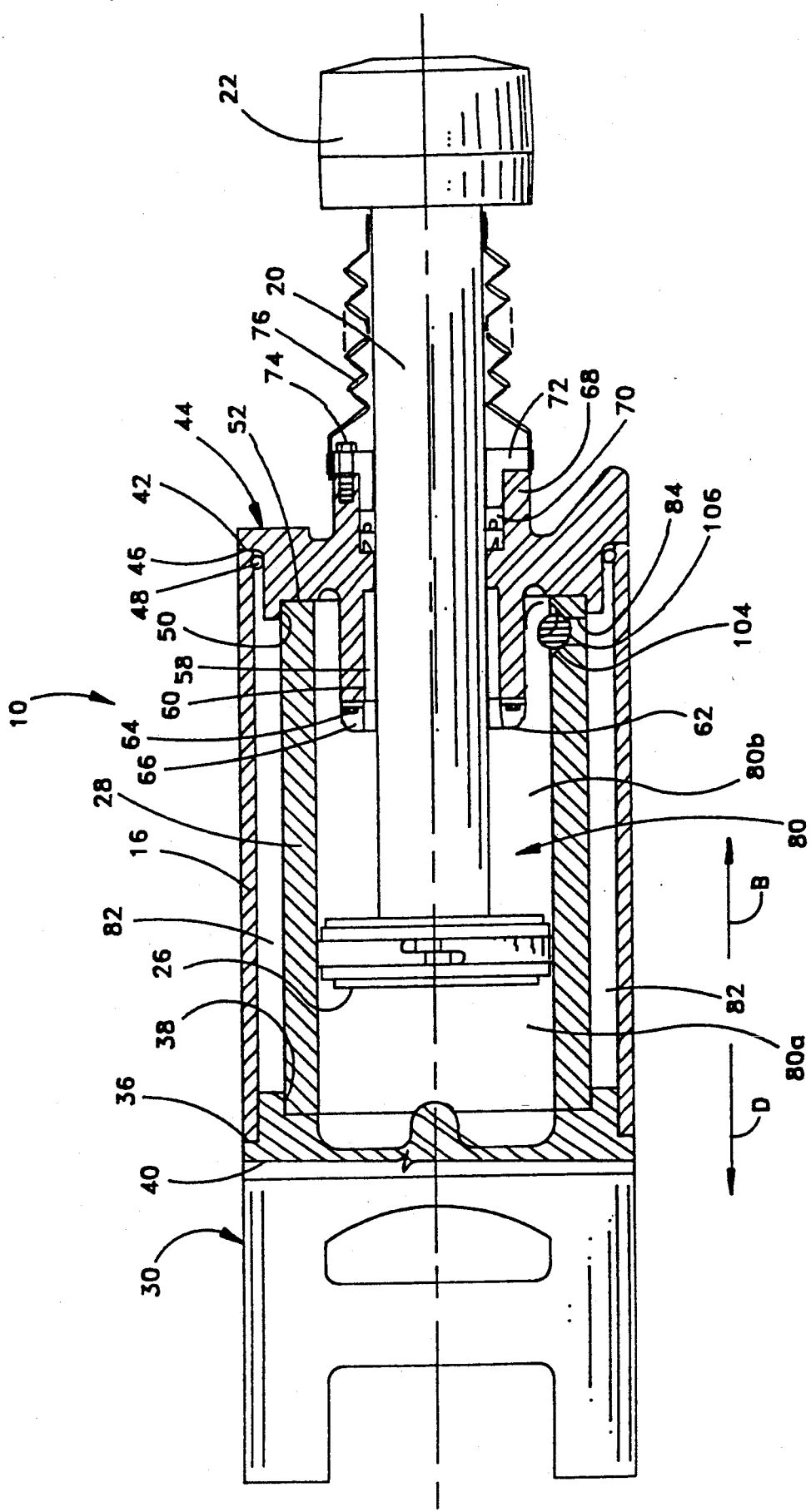
FIG. 2 is a partially sectional side view of a railway car hydraulic cushioning unit of the invention.
Figure 4:
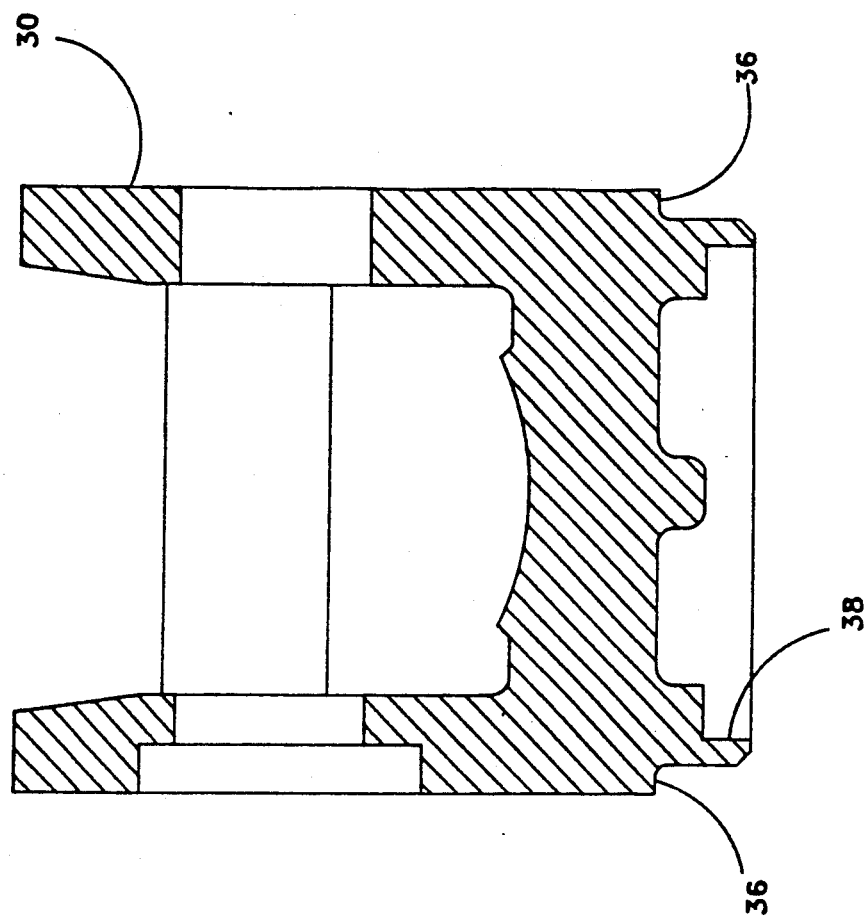
FIG. 4 is a side sectional view of the head casting taken along line 4—4 in FIG. 3.
Figure 3:
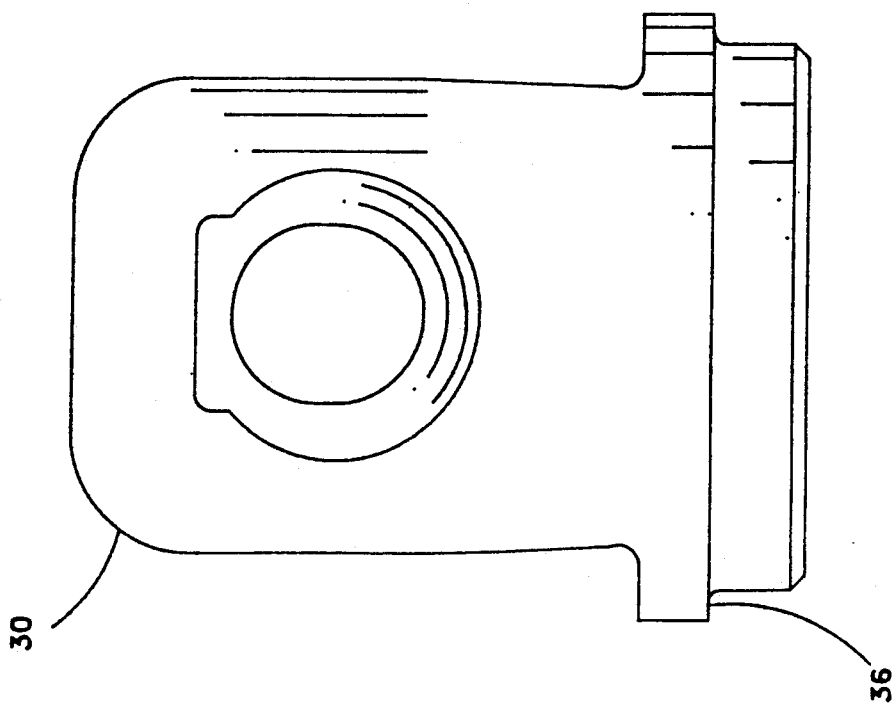
FIG. 3 is a bottom plan view of the head casting for the hydraulic cushioning unit of the invention.

Referring to FIG. 2, the opposite end of piston rod 20 carries a piston 26 which is reciprocally slideable within a high pressure cylinder 28 that is carried within outer housing 16. A head casting 30 closes the head end of the outer housing 16 and high pressure cylinder 28 and is designed to connect the outer housing 16 to a conventional railway car coupler 32. The coupler draw bar 34 is connected to the head casting 30 in the illustrated embodiment by a retention pin in the conventional manner for an MF-series head casting. Thus the piston 26 is stationarily secured relative to the railway car by means of the shaft alignment stop 22 whereas the cylinder 28 and outer housing 16 are longitudinally moveable with the coupler 32 in both a "draft" direction away from the center of the railway car and in a "buff" direction toward the center of the railway car. Hydraulic valving of fluid between the high pressure cylinder 28 and outer housing 16 affords hydraulic cushioning of both draft and buff forces on the coupler 32.

Referring to FIG. 2, outer housing 16 is an approximately 10" inside diameter cylindrical tube of a rigid material such as ASTM-A-519 steel. It fits over an annular shoulder 36 on the interior surface of the head casting 30 for rigid securement, such as by welding, to the head casting. That same interior surface of the head casting includes a socket 38 for receiving the head end 40 of high pressure cylinder 28 in press fit relation. A liquid sealant may be applied within the socket to assure a sealed connection to the cylinder 28.

Referring to FIGS. 2 and 5-7, the opposite rod end 42 of outer housing 16 is closed by a single rigid end cap 44 which includes an interiorly facing peripheral shoulder 46 adapted for rigid securement to the outer housing by welding or the like. An "o" ring 48 is interposed between the outer housing and end cap 44 as illustrated in FIG. 2. The interior surface of end cap 44 likewise defines a socket 50 into which the rod end 52 of cylinder 28 is fit in press fit relation. A liquid sealant may likewise be used to afford a sealed connection between the end cap and cylinder.

End cap 44 additionally includes an interiorly protruding ball stop sleeve 54 having an interior end 56 and an inside diameter which is oversize relative to piston rod 20 for telescopically receiving a brass guide sleeve 58 which is secured therein by a retainer ring 60. Piston rod 20 is axially slideably moveable within guide sleeve 58.

A resilient annular bumper ring 62 is secured to the interior end 56 of ball stop sleeve 54 by bolts 64 directed through holes and recessed portions 66 of ring 62. Ring 62 thus affords mechanical cushioning between piston 26 and cylinder 28 in the limit position of the cylinder in the draft direction of arrow D in FIG. 2.

A similar seal retention sleeve 68 protrudes exteriorly from end cap 44 for receiving a seal kit 70 which is secured in place by retainer 72 which is secured by bolts 74. An accordion like dust shield 76 has one end secured by a ring clamp to the field retention sleeve 68 or retainer 72 and the other end secured by a ring clamp to the piston rod 20 adjacent shaft alignment stop 22 to cover and protect that portion of the piston rod which reciprocates through end cap 44.

High pressure cylinder 28 defines an internal cavity 80 which is divided by piston 26 into cavities 80a and 80b on the head side and rod side of the piston, respectively. The main reservoir 82 is the space surrounding high pressure cylinder 28 and outer housing 16.

Figure 8:
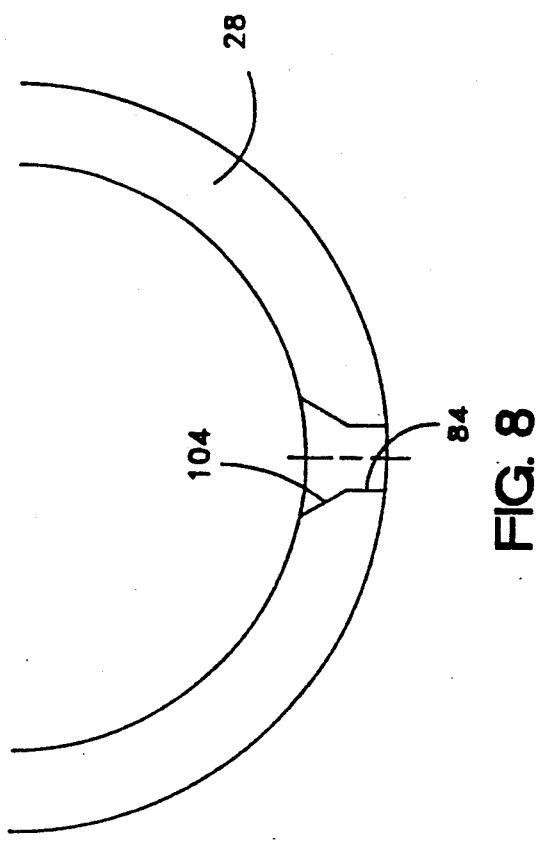
FIG. 8 is a partial sectional view through the ball valve of the high pressure cylinders.
Figure 10:
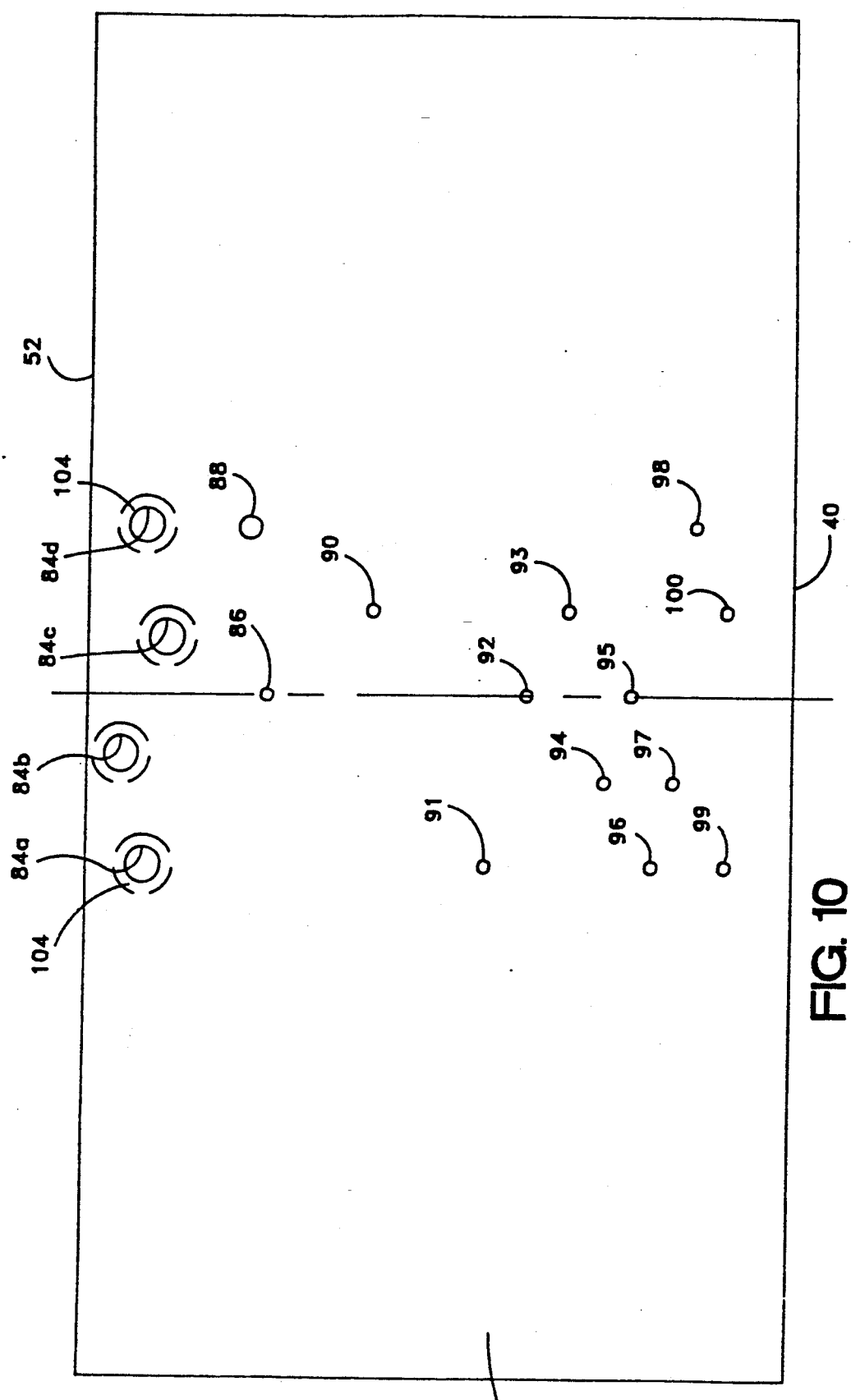
FIG. 10 is a diagrammatic view of the high pressure cylinder laid flat to identify the location of the porting holes and ball valves thereon.

To afford the valving of hydraulic fluid between the high pressure cylinder cavity 80 and main reservoir 82 in response to relative axial movement between the piston 26 and cylinder 28, the high pressure cylinder has a series of ball valve holes 84a through 84d adjacent the rod end of the cylinder, as shown in FIGS. 2, 8, and 10. In addition, as shown in FIG. 10 wherein the cylinder 28 is laid flat with the top end of the Figure corresponding to the rod end of the cylinder and the bottom of the Figure corresponding to the head end of the cylinder, there is provided a choked port 86 and a port 88 for a replacement LEE valve, also adjacent the rod end of the cylinder for controlling impedance during "runout" train action event.

Figure 9:
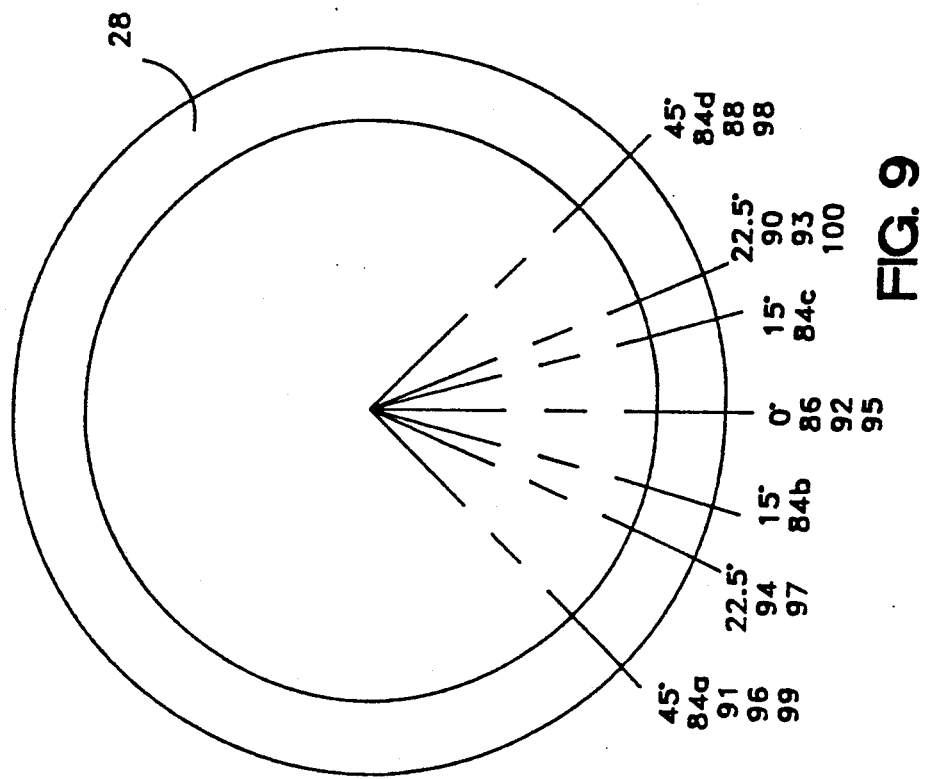
FIG. 9 is an end view of the high pressure cylinder with lines indicating the center line positions of porting holes therethrough.

Finally, a series of metering ports 90 through 100 are arranged in axially and circumferentially spaced apart relation through high pressure cylinder 28. The circumferential spacing of the metering port is evident in FIG. 9 and the longitudinal spacing is disclosed in FIG. 10. The metering ports are generally exponentially spaced apart in the axial direction so as to be somewhat clustered adjacent the head end of high pressure cylinder 28 and more sparsely positioned toward the rod end 52. This axial spacing, of course, affects the hydraulic cushioning action provided by the unit 10, as described below. It is understood that the high pressure cylinder cavity 80 is filled with hydraulic fluid and that the main reservoir 82 is substantially filled with hydraulic fluid to the level of line 102 in FIG. 11, the space above the fluid being filled with pressurized gas as described herein below.

During buff movement of the cylinder unit to the right in the direction of arrow B in FIG. 2, relative to stationary piston 26, hydraulic fluid expelled from cavity 80a into the main reservoir 82 through the metering ports. Fluid is returned to cavity 80b behind the piston through ball valve holes 84a through 84d. During draft movement of the cylinder unit to the left in the direction of arrow D in FIG. 2, relative to stationary piston 26, hydraulic fluid is expelled from cavity 80b through the metering ports and into the main reservoir 82. Fluid is returned to cavity 80a through the metering ports at the head end of cylinder 28. The ball valves associated with ball valve holes 84a through 84d prevent fluid flow from cavity 80b to main reservoir 82 in response to draft movement of the cylinder unit.

Because of the generally exponential spacing of the metering ports 90-100 in the axial direction, draft forces on the coupler initially produce significant longitudinal movement of the cylinder 28 relative to piston 26, but the same initial movement causes the piston to cover and close the cluster of metering ports adjacent the head end of cylinder 28 thereby increasing the impedance within cavity 80b, i.e., the resistance to flow of fluid outwardly of cavity 80b, which slows down relative movement between the cylinder 28 and piston 26. Continued draft movement of the cylinder 28 further increases impedance to the point where the piston covers the last ports 91 and 90 whereupon any further draft movement of the cylinder 28 is very slow. The extremes of the gear stroke, in both buff and drafted directions, are governed by mechanical stops that are part of the railway car installation.

Referring to FIG. 2 and 8, each ball valve includes the hole 84 having a ball seat 104 on its interior end for removably seating a ball 106. In a preferred embodiment, the ball valve hole 84 has a diameter of 0.820 inches and the ball seat 104 flares outwardly at a 30° angle to the axis of the hole. Ball 106 is preferably a one inch diameter steel ball.

The spacing between the ball stop sleeve 54 and ball seat 104 is less than one inch but sufficient to enable displacement of the ball 106 from the seat 104 for valving of hydraulic fluid therethrough. It is not sufficient, however, to enable dislodgement of the ball 106 from seat 104. It is a cooperation of the ball stop sleeve 54 and cylinder 28 which affords the ball valve function for the device.

Figure 5:
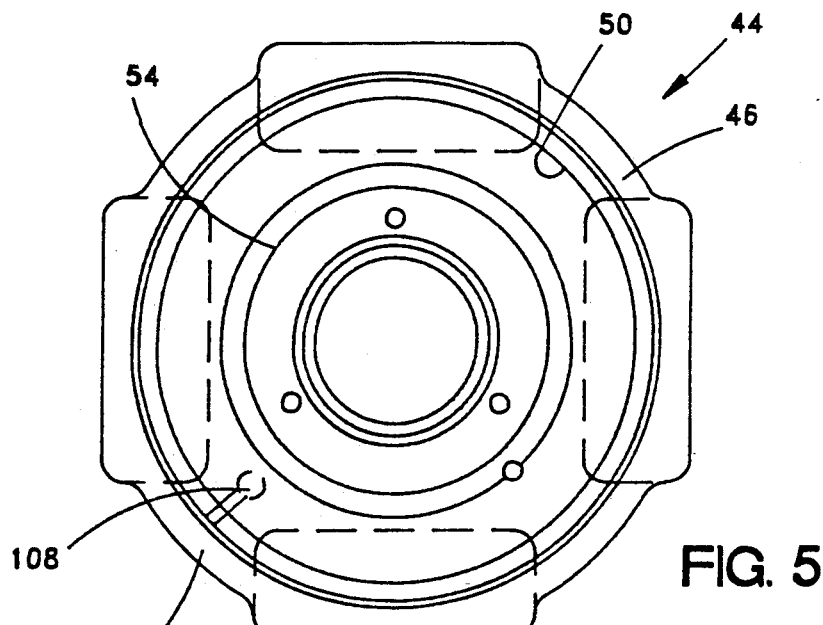
FIG. 5 is an elevational view of the interior surface of the end cap of the invention.
Figure 6:
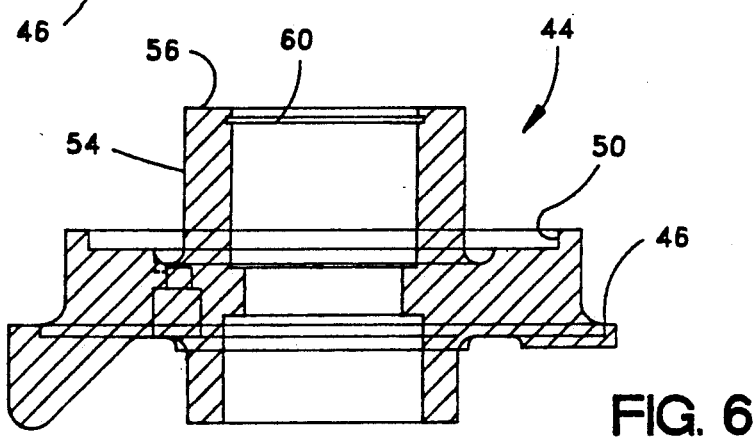
FIG. 6 is a sectional view of the end cap taken along line 6—6 in FIG. 5.
Figure 7:
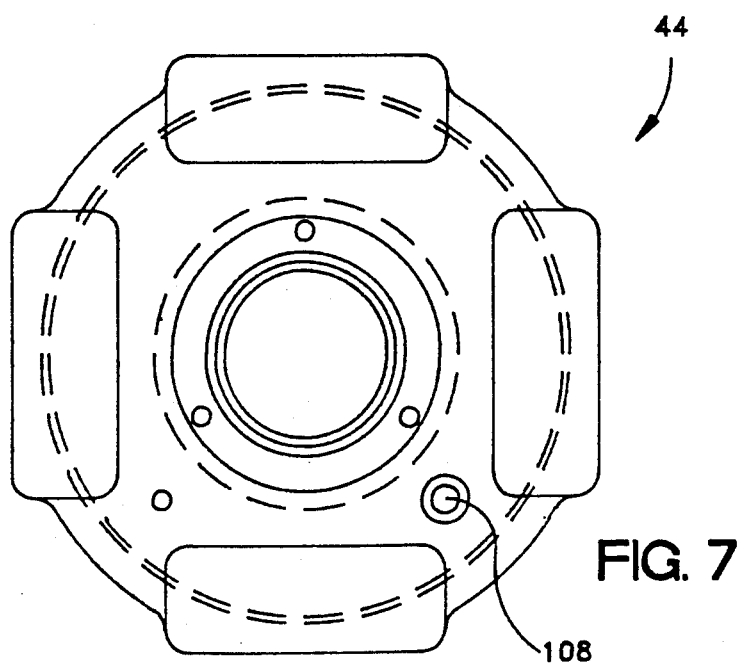
FIG. 7 is an elevational view of the exterior surface of the end cap of the invention.
Figure 11:
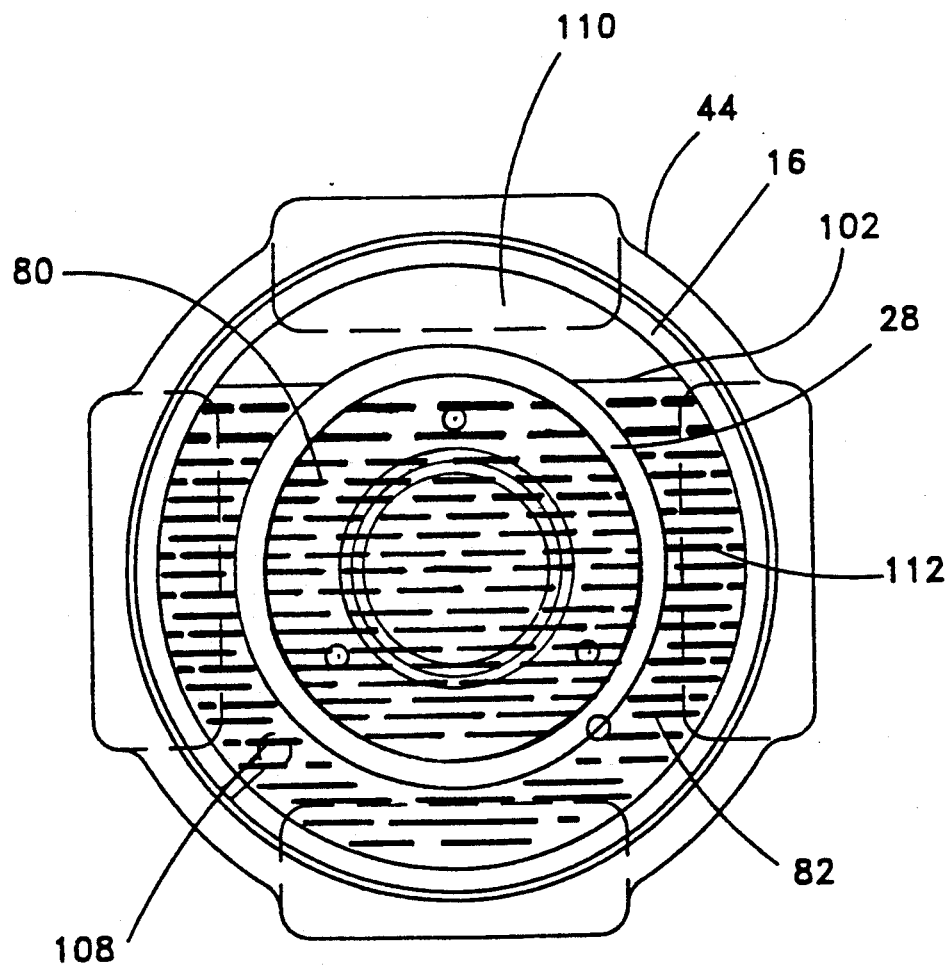
FIG. 11 is a sectional view through the unit showing levels of hydraulic fluid and gas in the main reservoir.

The fully assembled unit 10 is stood on the head end thereof for filling the cylinder cavity 80 and main reservoir 82 with hydraulic fluid through a filler port 108 shown in FIGS. 5 and 7. Approximately one quarter of fluid is siphoned from reservoir 82 so that space may be charged with a gas such as nitrogen to a pressure of approximately 450 psi. FIG. 11 shows the level of fluid 102 in the main reservoir 82 when the unit is laid on its side. The volume of gas charge in the main reservoir 82 is calculated to provide an adequate restoring force at both ends of the total piston stroke. Too small a volume would result in unnecessarily high pressure when the piston is in the full buff position.

The gas charge pressure with the piston in "neutral" is a nominal value which can easily absorb changes due to thermal expansion or contraction and still provide adequate restoration function.

The fluid pressure in the main reservoir 82 due to the gas 110 causes the high pressure cylinder cavity 80 to be completely filled with hydraulic fluid, preferably with no gas above the level 102 of hydraulic fluid 112 within the high pressure cylinder 28.

All metering of hydraulic fluid through the metering ports 90-100 occurs well below the top surface 102 of hydraulic fluid so as to minimize any turbulence at that surface which may produce a mixing of the hydraulic fluid and gas in a foaming action, as occurs in certain known hydraulic cushioning units.

It is preferred that the hydraulic cushioning unit 10 be designed to serve as an improved replacement unit for existing hydraulic cushioning units on railway cars. Accordingly, it is helpful that the limit positions of travel of the cylinder relative to the piston should correspond to those in existing hydraulic cushioning units. For this purpose, the length of the ball stop sleeve 54 is selected so that the piston will be compressed against bumper ring 62 just prior to engagement of the cylinder unit with the stop surface associated with the railway car sill 12.

Thus the simplified end cap 44 of the present invention performs numerous functions. First it closes the rod ends of both the outer housing 16 and high pressure cylinder 28. Secondly, it positions the resilient bumper ring 62 at the proper position for stopping draft movement of the cylinders at the same position it would be stopped by a prior art gear of the same style or series. Thirdly, the ball stop sleeve 54 cooperates with the ball valve holes 84 to prevent dislodgement of the balls 106 from the ball seats 104 and thereby afford operative valving of return fluid to the high pressure cylinder cavity 80b.

Whereas the invention has been shown and described in connection with a preferred embodiment thereof, it is understood that many modifications, additions, and substitutions may be made which are within the intended broad scope of the appended claims. For example, whereas the invention is disclosed in an MF-series style gear, the same structure may be incorporated into units adapted as replacements for any of the other known series and styles of gears. "Gears" is used herein to refer to the entire hydraulic cushioning unit.

Thus there has been shown and described a hydraulic cushioning unit which accomplishes at least all of the stated claims.

We claim:

1. A hydraulic cushioning unit for use in a railway car, comprising;

a high pressure cylinder having a wall, a rod end and an opposite head end, an outer housing encompassing said cylinder and having an opposite rod end and head end, head means at the head ends of said cylinder and housing for closing said head ends of said cylinder and housing, an end cap at the rod ends of said cylinder and housing, said end cap having a piston rod opening therethrough and closing said rod ends of said cylinder and housing but for said piston rod opening, said head means, outer housing and end cap forming a main reservoir around said high pressure cylinder, a piston movable through said cylinder, a piston rod connected to said piston and extending out of said cylinder through said opening, hydraulic oil at least partially filling said main reservoir, a plurality of porting holes formed through the wall of said high pressure cylinder, said holes being operative to effect a metered flow of hydraulic fluid from said high pressure cylinder to said main reservoir in response to relative movement between said piston and high pressure cylinder, a ball valve in a lower portion of said cylinder adjacent the rod end thereof, said ball valve including a valve hole through said cylinder, a ball seat at the interior end of said valve hole and a ball removably seated on said ball seat, said end cap including a ball stop protruding generally axially into said cylinder in spaced relation from a ball seated on said ball seat such that the clearance between said stop and ball enables valving displacement of said ball from the ball seat and prevents dislodgement of said ball from said valve.

2. The hydraulic cushioning unit of claim further comprising a bumper on an interior end of said ball stop to limit piston travel toward the rod end of the cylinder.

3. The hydraulic cushioning unit of claim further comprising a plurality of said ball valves.

4. The hydraulic cushioning unit of claim 3 wherein said stop comprises a sleeve protruding into said cylinder around said piston rod.

5. The hydraulic cushioning unit of claim 4 further comprising a bumper on an interior end of said stop to limit piston travel toward the rod end of the cylinder.

6. The hydraulic cushioning unit of claim 5 wherein said bumper comprises a resilient ring replaceably secured to the end of said sleeve.

7. The hydraulic cushioning unit of claim 5 further comprising a generally cylindrical piston rod guide telescopically received within said sleeve, said piston rod being axially slideable through said guide.

8. The hydraulic cushioning unit of claim 1 wherein said end cap defines an interiorly facing socket into which said high pressure cylinder is fit in press fit relation.

9. The hydraulic cushioning unit of claim 8 wherein said end cap is welded to said outer housing.

10. The hydraulic cushioning unit of claim further comprising:

a gas under pressure filling a top portion of said main reservoir not filled with hydraulic oil and operative to restore the piston to a neutral position adjacent said rod end of the cylinder upon removal of external relative forces between said high pressure cylinder and piston, said porting holes being arranged on the wall of said high pressure cylinder at positions below the level of gas in said main reservoir.

* * * * *